(12) United States Patent
Sun et al.

(10) Patent No.: US 8,408,476 B2
(45) Date of Patent: Apr. 2, 2013

(54) LENGTH MEASUREMENT SYSTEM BASED ON OPTICAL RECOGNITION PATTERN FOR LENGTH MEASUREMENT

(75) Inventors: Hsu-Sheng Sun, Taichung County (TW); Hung-Chih Lai, Taichung County (TW)

(73) Assignee: Charder Electronic Co., Ltd., Dali (TW)

( * ) Notice: Subject to any disclaimer, the term of this patent is extended or adjusted under 35 U.S.C. 154(b) by 27 days.

(21) Appl. No.: 12/929,437

(22) Filed: Jan. 25, 2011

(65) Prior Publication Data
US 2012/0104085 A1  May 3, 2012

(30) Foreign Application Priority Data

Oct. 28, 2010 (TW) ................ 99136930 A

(51) Int. Cl.
G06K 19/06 (2006.01)
G06K 7/10 (2006.01)
G06K 7/14 (2006.01)
G01D 5/347 (2006.01)

(52) U.S. Cl. ......... 235/494; 235/454; 33/707; 250/555; 250/566

(58) Field of Classification Search .......... 235/69, 235/70 R–70 D, 71 A, 79.5, 84, 462.01, 494, 235/454; 33/483, 488, 494, 759, 791, 810, 33/830, 512, 679.1, 293, 706, 707; 702/155, 702/158, 159, 161, 166; 382/313; 356/4.08
See application file for complete search history.

(56) References Cited

U.S. PATENT DOCUMENTS

| | | | | |
|---|---|---|---|---|
| 4,143,267 | A * | 3/1979 | Johnson et al. | 250/231.18 |
| 4,228,590 | A * | 10/1980 | Kimura | 33/765 |
| 5,058,188 | A * | 10/1991 | Yoneda | 382/313 |
| 5,253,431 | A * | 10/1993 | Smith | 33/810 |
| 5,433,014 | A * | 7/1995 | Falk et al. | 33/763 |
| 6,167,629 | B1 * | 1/2001 | Chiba | 33/293 |
| 6,729,035 | B1 * | 5/2004 | Carrillo | 33/566 |
| 7,291,849 | B1 * | 11/2007 | Baiocchi et al. | 250/491.1 |
| 7,644,505 | B2 * | 1/2010 | Zeng et al. | 33/293 |

FOREIGN PATENT DOCUMENTS

GB 2188426 A * 9/1987

* cited by examiner

*Primary Examiner* — Michael G Lee
*Assistant Examiner* — Suezu Ellis
(74) *Attorney, Agent, or Firm* — Bacon & Thomas, PLLC

(57) ABSTRACT

An optical recognition pattern for length measurement is mounted on an optical contact surface and includes a plurality of optical recognition units, each of which corresponds to a length value. The sequence of the optical recognition units on the optical contact surface is consistent with that of the corresponding length values in such a way that the optical recognition pattern imitating the conventional measuring ruler can be constituted. Besides, the optical recognition pattern can further work with an optical recognition device to constitute a length measurement system that the optical recognition is applied to.

11 Claims, 7 Drawing Sheets

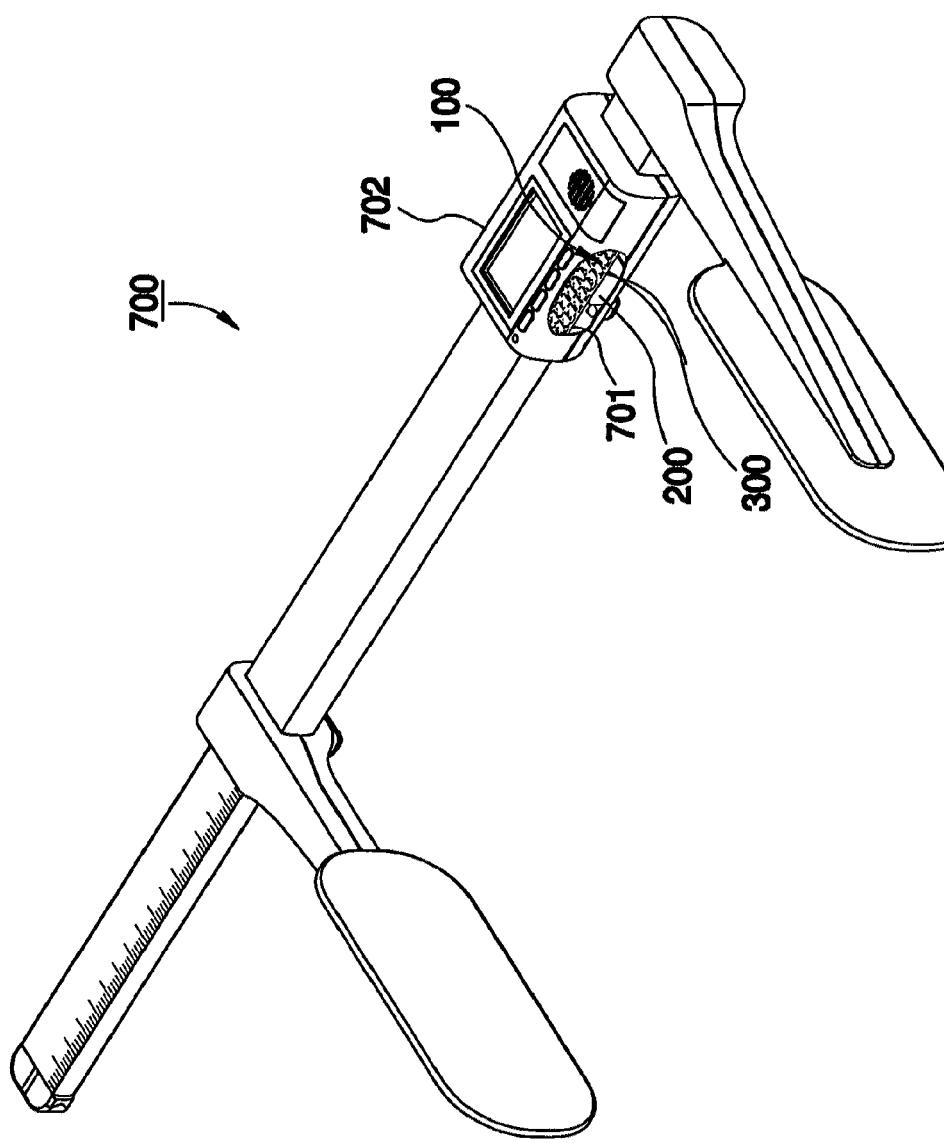

LENGTH MEASUREMENT SYSTEM BASED ON OPTICAL RECOGNITION PATTERN FOR LENGTH MEASUREMENT

BACKGROUND OF THE INVENTION

1. Field of the Invention

The present invention relates generally to length measurement, and more particularly, to a length measurement system based on optical recognition and an optical recognition pattern for length measurement.

2. Description of the Related Art

In addition to the traditional measuring ruler, conventional length measurement further includes two kinds of devices; the former is called capacitive digital encoder for measuring length based on capacitive variation resulting from relative movement of two elements having electrodes mounted on the surfaces thereof; the latter is called photoelectric digital encoder for measuring length based on a light source pulse variation resulting from relative movement of two elements having rasters mounted on the surfaces thereof.

The aforesaid conventional measurement devices each have the same principle—accumulative calculation, so they must memorize the initial values and cannot be shut down. Otherwise, they need to be zeroized after shut down and restarted. Thus, they fail to be accessed at any time after restarted, thus being inconvenient in operation.

In addition, in the case of the aforesaid conventional measurement devices, when the user quickly moves the elements having electrodes or rasters mounted on, it tends to happen that the detection of the capacitive change or pulse change cannot keep up with the aforesaid movement in such a way that the outcome of the measurement may not be correct.

In other words, the aforesaid conventional measurement devices and method are defective to need improvement.

SUMMARY OF THE INVENTION

The primary objective of the present invention is to provide an optical recognition pattern for length measurement, which can improve the aforesaid prior art.

The secondary objective of the present invention is to provide a length measurement system based on optical recognition, which can improve the aforesaid prior art.

The foregoing objectives of the present invention are attained by the length measurement system and the optical recognition pattern. The optical recognition pattern is mounted on an optical contact surface and includes a plurality of optical recognition units, each of which corresponds to a length value. The sequence of the optical recognition units on the optical contact surface is consistent with that of the corresponding length values.

In light of the above, the present invention can constitute an optical recognition pattern imitating the convention measuring ruler by the optical recognition units which can record information, by applying the existing optical recognition units applicable to length measure or creating and applying alternative optical recognition units applicable to length measure, and sequencing the optical recognition units, further being applied to the length measurement. For example, the optical recognition pattern of the present invention can be mounted to a wall, a measuring ruler, a conventional measurement device having rasters or electrodes mounted thereon, or the surface of an object in need of length measurement and can further coordinate with an optical recognition device to create an optical recognition length measurement device. Besides, the optical recognition pattern can be further mounted to a flexible object because the optical recognition units can still be accessed by the optical recognition device even if they are of non-planar display, so that the present invention can be more broadly applied.

Further, if it is intended to enable the optical recognition pattern to be subject to ignorance for the human eyes, optical identification (OID) code can do the job. On the contrary, one-dimensional (1D) or two-dimensional (2D) barcode can be another alternative. Other kinds of the optical recognition units which can record information are also applicable.

Further, depending on the size of the product that the present invention is applied to or on other requirement and limitation, the optical recognition pattern of the present invention can be multiple and arranged to become 1D or 2D array to enhance operational convenience, design freedom, and applied scope.

Further, if it is intended to create measurement devices of different measuring precisions, the same optical recognition units of the present invention can be arranged adjacently. The more the same optical recognition units are, the lower the precision is.

Further, the two adjacent optical recognition units can be sequenced without or with an interval provided therebetween, depending on the species of the optical recognition units, precision setting, and recognitive capability of the optical recognition device.

BRIEF DESCRIPTION OF THE DRAWINGS

FIG. 8 is a schematic view of the preferred embodiment of the present invention applied to an electronic telescopic height measurement apparatus.

DETAILED DESCRIPTION OF PREFERRED EMBODIMENTS

Referring to FIGS. 1-6, an optical recognition pattern 100 and an example that the optical recognition pattern 100 is applied to the length measurement are constructed in accordance with a preferred embodiment of the present invention. The optical recognition pattern 100 can work with an optical recognition device 200, such that the optical recognition pattern 100 must be mounted on an optical contact surface 101. As for the optical contact surface 101, as long as it can allow the optical recognition pattern 100 to be accessed by the optical recognition device 200, the optical contact surface 101 can be, for example, a portable or non-portable device having a light source, an image sensing unit (e.g. CCD or CMOS), an image processing unit (e.g. DSP and memory), and an output unit. Please refer to U.S. Pat. No. 7,669,774 for detailed optical recognition principle, which recitation is skipped. The present invention is about how to create the optical recognition pattern applied to the length measurement as recited below.

Figure 1:
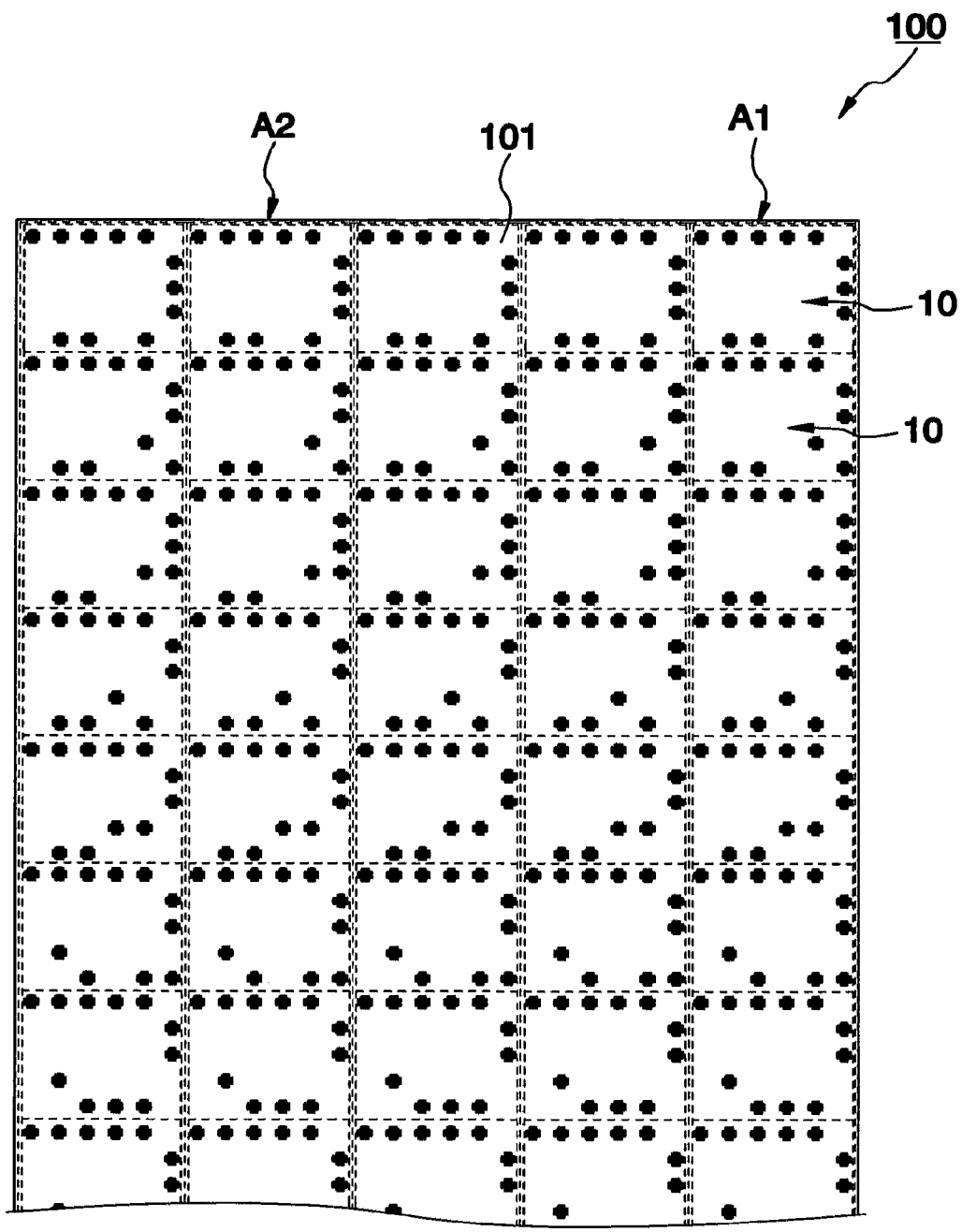
FIG. 1 is an enlarged view of the optical recognition pattern in accordance with a preferred embodiment of the present invention.
Figure 2:
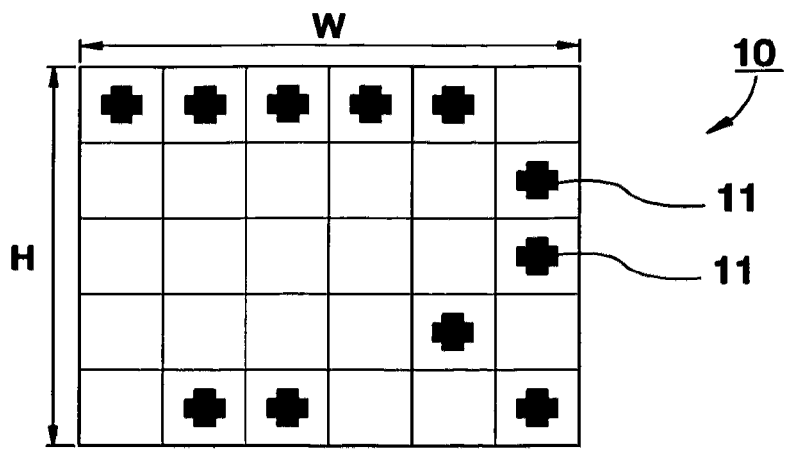
FIG. 2 is an enlarged view of the optical recognition unit in accordance with the preferred embodiment of the present invention.
Figure 3:
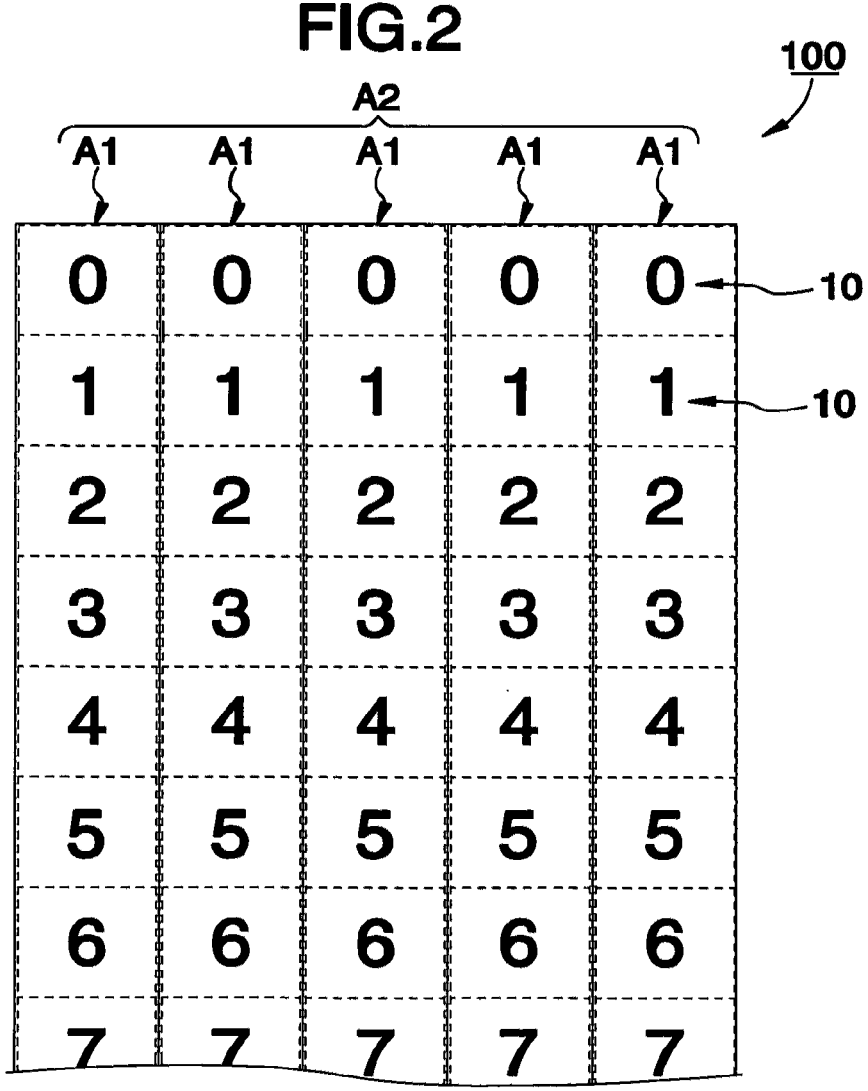
FIG. 3 is a schematic view of the numeric codes of the optical recognition pattern in accordance with the preferred embodiment of the present invention.
Figure 4:
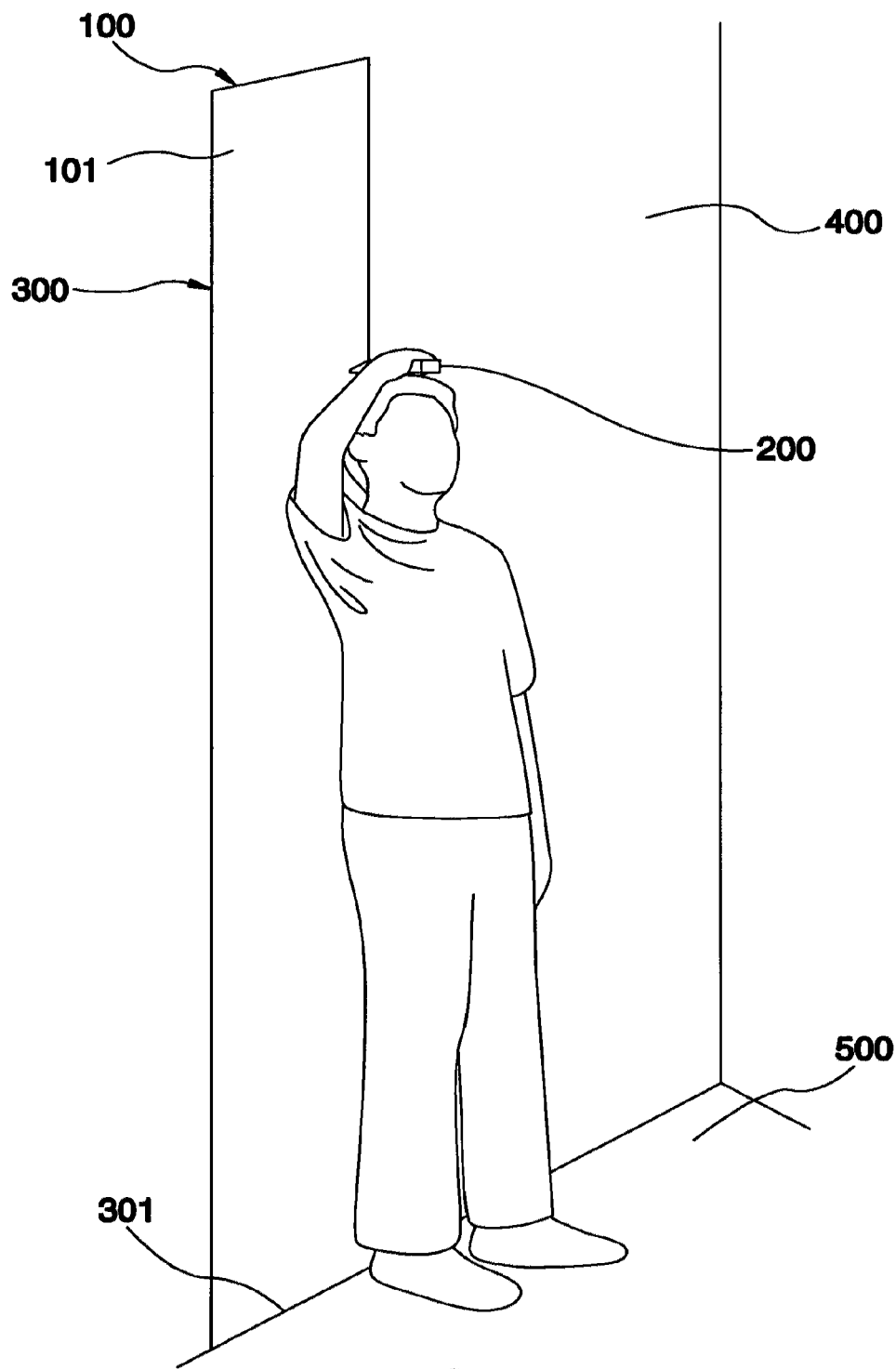
FIG. 4 is a schematic view of the preferred embodiment of the present invention applied to a height measuring ruler on the wall.

The optical recognition pattern 100 is composed of a plurality of optical recognition units 10. Referring to FIGS. 1-3 first, the optical recognition units 10 can be the OID codes as an example. As shown in FIG. 2, the optical recognition pattern 100 can have 4096 variations by means of permutation and combination of a plurality of internal micro pixels 11 provided in each of the OID codes and such variations can be identified by the optical recognition device as 4096 information entries. The detailed principle of the OID code can also be referred to the U.S. Pat. No. 7,669,774.

Referring to FIGS. 1 & 3 again, in this embodiment, the optical recognition units 10 can be printed with proper printing resolution on the optical contact surface 101 to become a 2D array A2 composed of a plurality of identical longitudinal 1D arrays A1. In each of the 1D arrays A1, at least 4096 optical recognition units 10 are provided and each of the optical recognition units 10 indicates a measuring datum, which is the initial information acquired from each of the optical recognition units 10 by the optical recognition device 200 in this embodiment and can be a numeric code as an integer (0-4095), as shown in FIG. 3. The optical recognition units 10 are sequenced according to the sequence of the corresponding numeric codes; in this embodiment, the optical recognition units 10 are consecutively sequenced from 0 to 2800, the total umber of which depends on the maximum measurable length, and the adjacent two optical recognition units 10 have no interval therebetween because they are sequenced consecutively. Thus, the optical recognition pattern 100 applicable to the length measurement is created.

Each of the optical recognition units 10 includes a height H and a width W. The OID code is actually 0.423 mm high and 0.508 mm wide. The numeric code of each optical recognition unit 10 is directed to one corresponding length value, which is the product of the height H and its corresponding numeric code of the optical recognition unit 10. The product is calculated by the optical recognition device 200. For example, the numeric code of the rightmost optical recognition unit 10 at the second row is 1, so its length value is 1×0.423=0.423 mm. The optical recognition device 200 of this embodiment is set to have a carry set based on that the decimal of the three decimal places of aforesaid length value is bigger to or equal to 0.250 mm, such that 0.423 mm is carried to become 0.5 mm. Similarly, the optical recognition unit 10 which numeric code is 2800 is directed to a length value of 1184.4 mm, i.e. 2800×0.423, and then carried to become 1184.5 mm. In light of this, the optical recognition units 10 can be sequenced according to the sequence of their corresponding length values to have the precision of 0.5 mm. The length value acquired after the optical recognition is approximately equal to the actual one and the inaccuracy will be allowable if applied to the height measurement.

It is to be noted that the above-mentioned size and quantity are for example only. For instance, if the height of another kind of the optical recognition unit is exactly 0.5 mm, after the optical recognition pattern is consecutively sequenced, its length value detected by the optical recognition device will be equal to the actual length.

In addition, the relationship of sequence is not necessarily available among such measuring data and such measuring data can be sequenced in random order as long as the optical recognition device has corresponding built-in length values.

Furthermore, the aforesaid measuring data can be saved in the format of length value beforehand without the calculation of multiplication.

Referring to FIG. 4 again, in actual use, the optical recognition pattern 100 is printed on a transparent substrate 300 beforehand and then the transparent substrate 300 is adhered to a working surface, like a wall 400; next, a bottom end 301 of the transparent substrate 300, having a numeric code 0 printed thereon, is aligned with a ground 500. In this way, the user only needs to press the optical recognition device 200 against the top of his or her head and then to enable a front end of the optical recognition device 200 to be stopped against or to approach the transparent substrate 300, such that the user's height can be detected. Besides, the optical recognition units 10 located at the same row in the optical recognition pattern 100 are the same. In this way, the user can measure the optical recognition pattern at the same horizon to get the same length value, so it is more convenient and easier for the user in operation.

Figure 5:
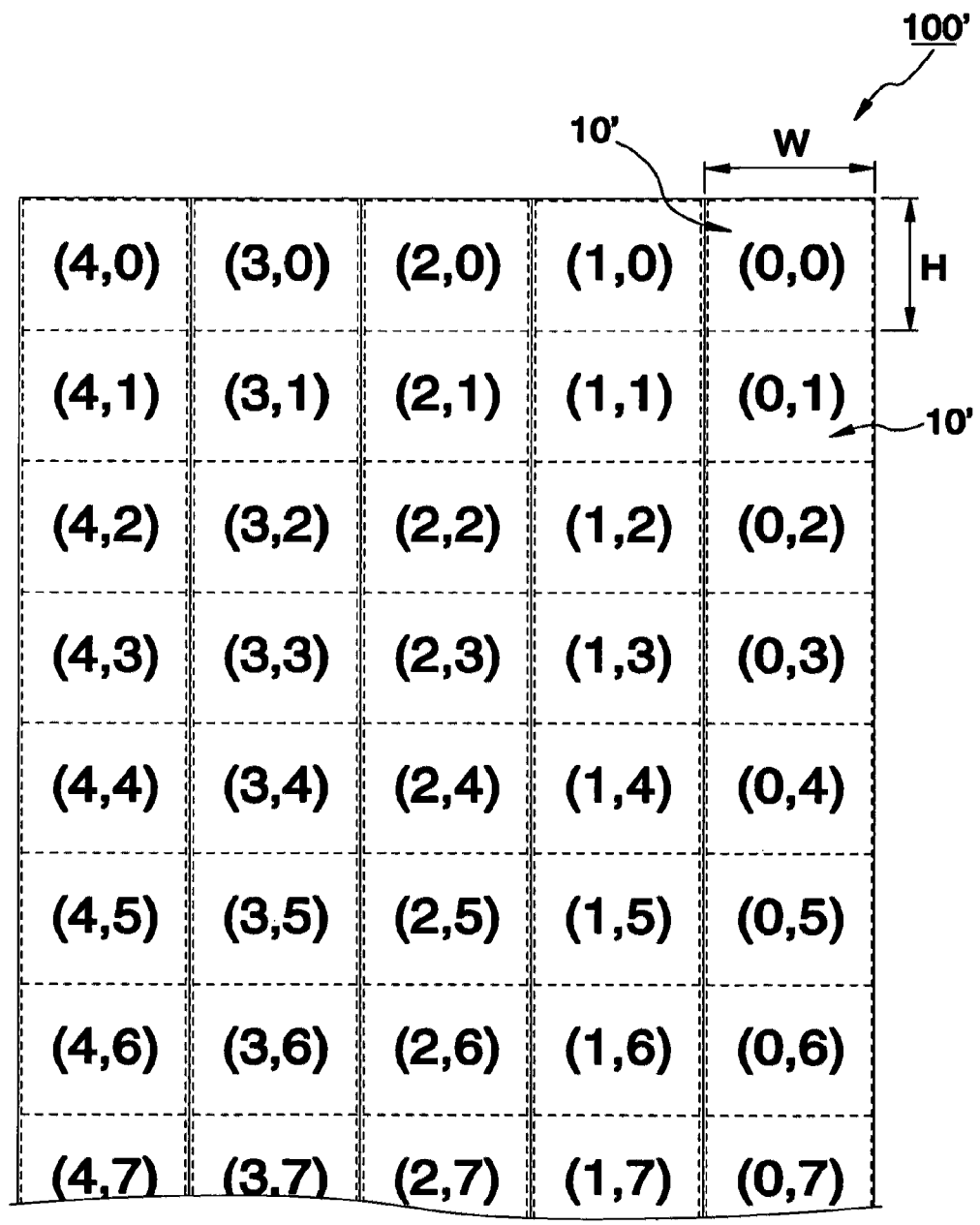
FIG. 5 is a schematic view of the numeric codes of the optical recognition pattern, which can measure length and width at the same time.

The present invention can be alternatively an optical recognition pattern 100' which can measure length and width at the same time. As shown in FIG. 5, the measuring datum of every optical recognition unit 10' can be set as two numeric codes defined as an X value and a Y value, i.e. (X,Y), for access by the optical recognition device. When the optical recognition device accesses the optical recognition unit 10', after the accessed Y value times the height H and the accessed X value times the width W, a predetermined carry calculation can selectively proceed to acquire the width value and the length value to which the optical recognition unit 10' is directed and then the acquired width and length values can be applied to a device in need of measuring length and width at the same. The aforesaid X and Y values can be saved in the format of the width and length values beforehand without any multiplication calculation.

Because the OID code is subject to ignorance for the human eyes and may need an electronic microscope for observability, and it is printed on the transparent substrate 300, it does not destroy the appearance of the wall 400.

The transparent substrate 300 can be adhered to the existing height measuring ruler (not shown) on the wall and does not hinder the user's observation for the existing graduations and patterns on the height measuring ruler, such that the physical and electronic measurement can be attained at the same time. Alternatively, the OID codes can be printed on an opaque substrate.

As indicated above, the present invention is to record the information via the optical recognition units, to apply the existing optical recognition units or creating alternative optical recognition units applicable to length calculation, to set that each optical recognition unit corresponds to a length value, and to sequence the optical recognition units according to the sequence of the length values, such that the present invention constitutes a length measurement system based on the optical recognition. Compared with the prior art, the present invention provides a brand new length measurement system and method and it is attained by the optical recognition units that can save information, such that the optical recognition device of the present invention can be used without zeroization soon after it is shut down and restarted at any time, being very convenient for operation. Besides, no matter how the user quickly moves the optical recognition device, as long as the optical recognition device stops on the optical recognition pattern, it can show the correct value.

It is to be noted that if it is intended to make another optical recognition pattern which measuring precision is different from that of the aforesaid embodiment, the same optical recognition units can be arranged adjacently. For example, the sequence of the optical recognition units 10 in the 1D arrays A1 is changed to that of the numeric codes, 0, 0, 1, 1 . . . 2800, 2800. In this way, the measuring precision of the optical recognition pattern 100 becomes 1 mm instead of 0.5 mm, and so forth.

Figure 6:
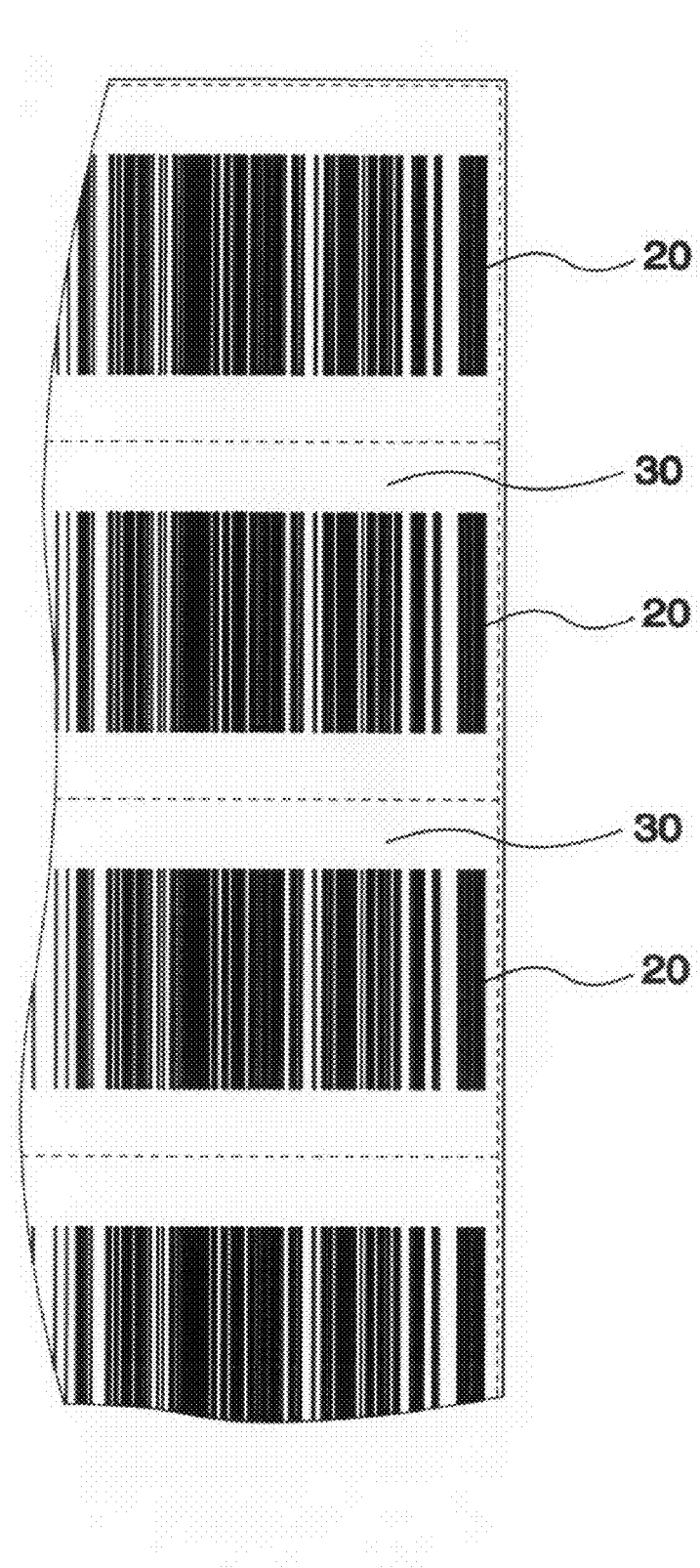
FIG. 6 illustrates that the optical recognition unit of the optical recognition pattern is barcode.

Furthermore, the adjacent two optical recognition units 10 can have an interval provided therebetween in such a way that the precision can also be adjusted. If the optical recognition unit is 1D or 2D bar code, as shown in FIG. 6, the adjacent two bar codes 20 must have an internal 30 provided therebetween, such that they need a special optical recognition device, such as an optical recognition device, which has dual image sensing units or can recognize and filter out the interval. In addition, each of the bar codes 20 can also be set as a measuring datum corresponding to a length value and the bar codes 20 can be sequenced according to the sequence of the length values, thus being applicable to the length measurement.

Figure 7:
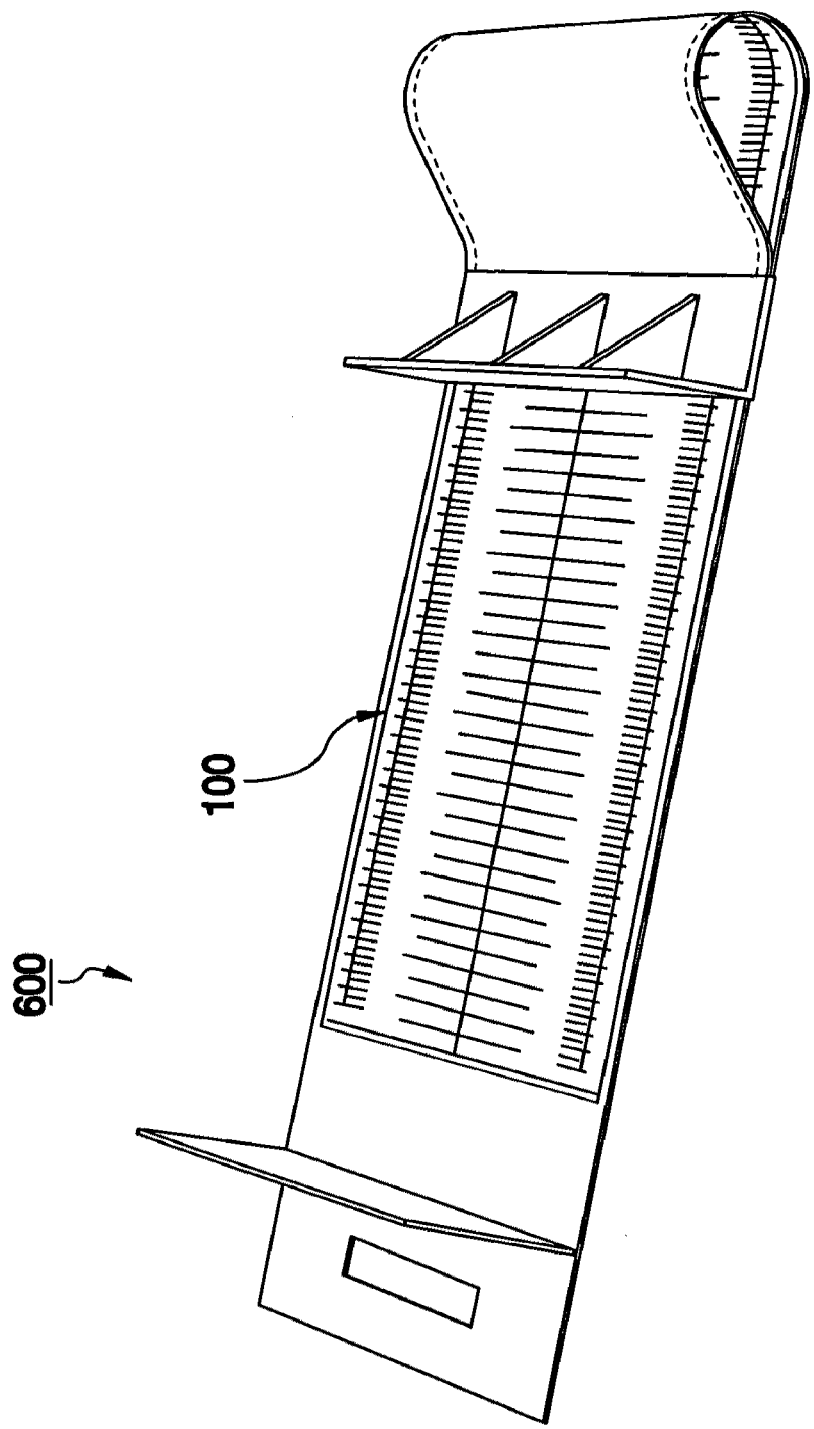
FIG. 7 is a schematic view of the preferred embodiment of the present invention applied to a flexible height measurement apparatus.

The present invention can further applied to a flexible height measurement apparatus 600 shown in FIG. 7. Although such application may result in non-planar display of the optical recognition units on the optical recognition pattern 10, they can still be recognized and accessed by an optical recognition device (not shown). However, the conventional electronic digital encoder fails to do so.

In addition, the present invention can also be applied to an electronic telescopic height measurement apparatus 700 shown in FIG. 8. Specifically, the optical recognition pattern 100 can be printed on the transparent substrate 300 and then transferred to the surface of an internal measuring ruler 701 of the measurement apparatus 700 and the optical recognition device 200 can be integrated into a control panel 702, such that height measurement can be done.

Although the present invention has been described with respect to a specific preferred embodiment thereof, it is in no way limited to the specifics of the illustrated structures but changes and modifications may be made within the scope of the appended claims.

What is claimed is:

1. An optical recognition pattern for length measurement, mounted on an optical contact surface, comprising:
   a plurality of machine readable optical identification (OID) codes disposed at corresponding positions on said optical contact surface, each of which is encoded with a length value associated with its corresponding position, wherein the plurality of OID codes are sequenced on the optical contact surface according to a sequence of the length values, wherein the OID codes are sequenced to be a two dimensional (2D) array, each of the OID codes having a measuring datum containing two numeric codes, each of the OID codes having a height at a one dimensional (1D) array direction and a width at a direction perpendicular to the 1D array direction, the product of the two numeric codes and the height and the width being equal to their corresponding length value and width value respectively, the length value being equal to the actual length.

2. The optical recognition pattern as defined in claim 1, wherein each of the OID codes comprises a measuring datum containing a numeric code, each of the OID codes having a height at a one dimensional (1D) array direction, the product of the height and the numeric code being equal to its corresponding length value, the length value being equal to or approaching the actual length.

3. The optical recognition pattern as defined in claim 1, wherein each of the OID codes comprises a measuring datum, which is equal to its corresponding length value.

4. The optical recognition pattern as defined in claim 1, wherein each of the OID codes is selected from a group consisting of OID code, one dimensional (1D) bar code, and two dimensional (2D) bar code.

5. The optical recognition pattern as defined in claim 1, wherein the OID codes comprise a plurality of groups of identical measuring data, the OID codes of the identical measuring data being adjacently sequenced.

6. The optical recognition pattern as defined in claim 1, wherein two adjacent OID codes do not have any interval provided therebetween.

7. The optical recognition pattern as defined in claim 1, wherein two adjacent OID codes have an interval provided therebetween.

8. The optical recognition pattern as defined in claim 1, wherein the OID codes are not observable by human eyes.

9. The optical recognition pattern as defined in claim 1, wherein the OID codes are of non planar display disposed on a non-planar surface.

10. The optical recognition pattern as defined in claim 1, wherein the optical recognition pattern is mounted on a substrate having two sides, one of which constitutes the optical contact surface and the other of which is for combination with the surface of an object.

11. A length measurement system that optical recognition is applied to, comprising:
   a plurality of machine readable optical identification (OID) codes disposed at corresponding positions on an optical contact surface, each of which is encoded with a length value associated with its corresponding position, the OID codes are sequenced according to a sequence of their length values, wherein the OID codes are sequenced to be a two dimensional (2D) array, each of the OID codes having a measuring datum containing two numeric codes, each of the OID codes having a height at a one dimensional (1D) array direction and a width at a direction perpendicular to the 1D array direction, the product of the two numeric codes and the height and the width being equal to their corresponding length value and width value respectively, the length value being equal to the actual length; and
   an optical recognition device for acquiring the corresponding length values of the OID codes.

* * * * *